Feb. 25, 1930.  C. C. SHIPP  1,748,088
RADIATOR THERMOSTAT MOUNTING
Filed April 24, 1929
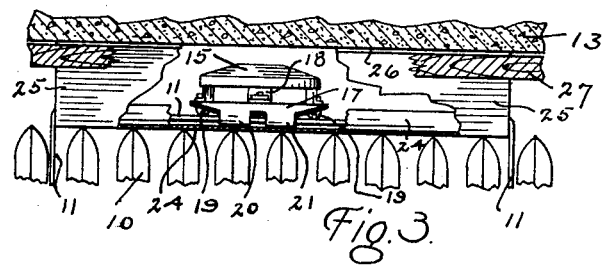
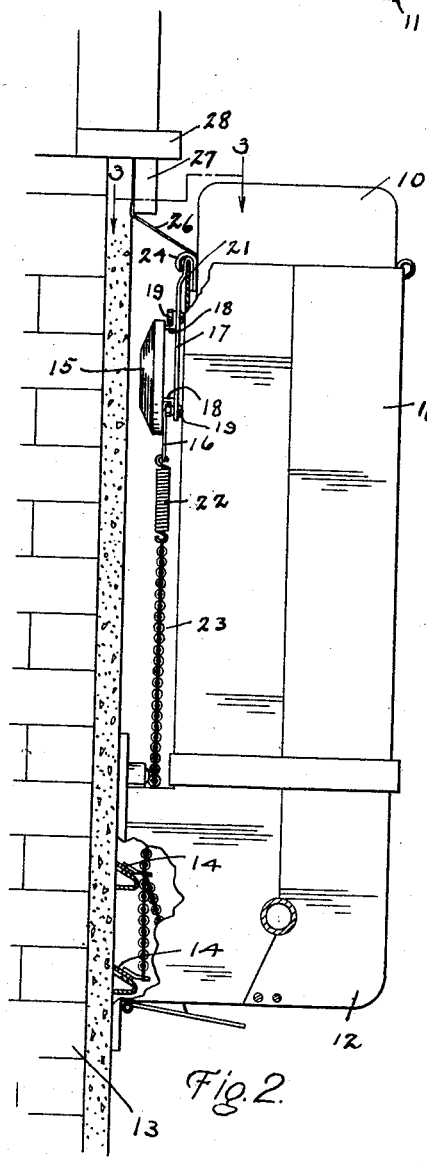
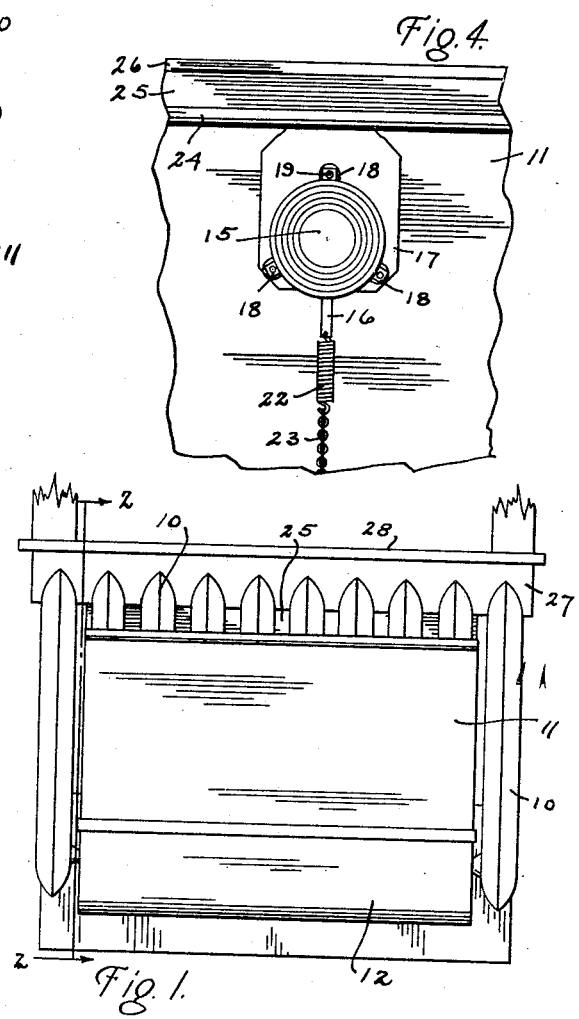
INVENTOR,
Clarence C. Shipp.
By Minturn & Minturn,
Attorneys.

Patented Feb. 25, 1930

1,748,088

UNITED STATES PATENT OFFICE

CLARENCE C. SHIPP, OF INDIANAPOLIS, INDIANA

RADIATOR-THERMOSTAT MOUNTING

Application filed April 24, 1929. Serial No. 357,856.

This invention relates to means for regulating a flow of air through a housing about a heating radiator and particularly to the mounting of such means whereby it will be subjected to room temperatures and not radiator temperatures though mounted in close proximity to the radiator.

It is now common practice to completely surround the principal part of a heating radiator by a housing and provide a duct through the building wall to conduct fresh air from without the building through the duct to the housing to have the air pass up through the housing, be heated by the radiator and discharged into the room being heated. A damper is positioned in the duct to regulate the amount of air admitted to the housing as may be required, and where an automatic control is employed, a thermostat is commonly employed to open and close the damper in accordance with a predetermined rise and fall of temperature about the thermostat.

For mechanical reasons, it is desirable to have the thermostat near the damper, and to prevent tampering with the thermostat and connections between it and the damper, all of such parts should be concealed and out of reach of persons in the room being heated. A radiator should be located near or under a window on the outside wall of the room, and to locate a thermostat at such a position has heretofore subjected it to air currents leaking in around the window which at times would interfere with the proper functioning of the thermostat in response to room temperature changes.

It is the primary purpose of my invention to overcome the problems above indicated by providing a mounting and shielding of the thermostat that will permit its being located between the radiator and the wall therebehind and yet be removed from influence of cold air leaking in around the window or direct heat radiation from the radiator, and be responsive to room temperature changes.

A further object is to provide a quickly detachable mounting of the thermostat for repair or adjustment purposes.

These and other objects will become apparent in the following description of one form of the invention, with reference being made to the accompanying drawing, in which—

Fig. 1 is a front elevation of a radiator to which the invention is applied;

Fig. 2, a vertical section on the line 2—2 in Fig. 1 on an enlarged scale;

Fig. 3, a horizontal section on the line 3—3 in Fig. 2; and

Fig. 4, a rear elevation of the thermostat.

Like characters of reference indicate like parts throughout the several views in the drawing.

The radiator 10 is here shown with a housing 11 surrounding its sides, back and front, and a box base 12 enclosing the under side of the radiator. The box base is in communication with a passage conducting fresh air through the wall 13 and dampers 14 are mounted in this passage to control the amount of air admitted to pass up through the housing 11.

A thermostat 15 having an arm 16 movable vertically with heat changes about the thermostat is mounted on a plate 17 by means of a plurality of legs 18, here shown as three in number, being secured thereto by the bolts 19, to have an appreciable space between the plate 17 and the thermostat 15. The exact construction of the thermostat is not here shown, since it is well known to those versed in the art and the details do not here form a part of the invention.

The upper end of the plate 17 is bent away from the thermostat thence upwardly around and downwardly to form the hooks 20 and 21 which are engaged over the top edge of the housing 11 back of the radiator 10. The heads of the bolts 19 form buttons or spacing elements to hold the plate 17 rearwardly from the housing 11 to provide an air space therebetween.

A spring 22 is engaged in the lower end of the arm 16 and a chain 23 is suspended from the lower end of the spring 22 to pass downwardly into the box base 12 to engage with the dampers 14 so that when the arm 16 raises, the dampers 14 are pulled open.

A removable strip 24 is formed with a vertical leg to fit on the front side of the rear wall of the housing 11 and has its upper portion curved over, around, downwardly and backwardly to engage over the top edge of the wall of the housing, Fig. 2, to compressively engage the hooks 20 and 21 and the wall therebetween. The housing 11 is spaced a distance from the wall 13 and the thermostat 15 is also carried in spaced relation thereto.

To prevent cold air currents leaking in around the window above the radiator 10 from affecting the thermostat 15, a shield 25 is formed with an upturned lip 26 to engage up under the casing board 27 under the window sill 28 and extends obliquely therefrom over against the back side of the radiator 10 to rest on the top of the strip 24. Air leaking in from the window is thus deflected from normally dropping behind the housing 11 across the thermostat 15 to the warm air currents arising from the housing 11.

It is thus to be seen that the temperature between the radiator 10 and the wall 13 will be substantially that of the room, and that the thermostat 15 is positioned to be inaccessible to unwarranted tampering, but may be easily removed if necessary.

I claim:

1. The combination with a radiator, a housing around the radiator, and a damper admitting air to the housing, of a thermostat, a plate removably hooked over the top edge of the housing, said thermostat being affixed to said plate, and detachable means operatively interconnecting said thermostat with said damper.

2. The combination with a radiator, a housing around the radiator, and a damper admitting air to the housing, of a thermostat, a plate removably hooked over the top edge of the housing, said thermostat being affixed to said plate, and detachable means operatively interconnecting said thermostat with said damper, means spacing said plate from said housing, and detachable means yieldingly retaining said plate on said housing.

3. The combination with a radiator adjacent a wall, a housing around the radiator and spaced from the wall, and a damper for admitting air to the housing, of a plate, a hook on the plate adapted to engage over the top edge of the housing to have the plate suspended thereby between the housing and the wall, a thermostat secured to the plate on the side toward the wall, said thermostat being spaced from the plate, a rolled strip fitted over the top edge of the housing and engaging the hook thereunder, and detachable operating means interconnecting said thermostat and said damper.

4. The combination with a radiator adjacent a wall, a housing around the radiator and spaced from the wall, and a damper for admitting air to the housing, of a plate, a hook on the plate adapted to engage over the top edge of the housing to have the plate suspended thereby between the housing and the wall, a thermostat secured to the plate on the side toward the wall, said thermostat being spaced from the plate, a rolled strip fitted over the top edge of the housing and engaging the hook thereunder, and detachable operating means interconnecting said thermostat and said damper, and a baffle plate between said wall and the top of said housing.

5. The combination with a radiator adjacent a wall, a housing around the radiator and spaced from the wall, and a damper for admitting air to the housing, of a plate, a hook on the plate adapted to engage over the top edge of the housing to have the plate suspended thereby between the housing and the wall, a thermostat secured to the plate on the side toward the wall, said thermostat being spaced from the plate, a rolled strip fitted over the top edge of the housing and engaging the hook thereunder, and detachable operating means interconnecting said thermostat and said damper, and a baffle plate between said wall and the top of said housing, said plate having an upturned edge bearing against said wall and extending obliquely therefrom downwardly to rest along on the top of said strip.

In testimony whereof I affix my signature.

CLARENCE C. SHIPP.